(12) United States Patent
Braz et al.

(10) Patent No.: US 12,031,423 B2
(45) Date of Patent: Jul. 9, 2024

(54) WELL CONSTRUCTION OPTIMIZATION TECHNIQUES

(71) Applicant: Landmark Graphics Corporation, Houston, TX (US)

(72) Inventors: Paulo Alves Braz, Rio de Janeiro (BR); Roger David Marin Martinez, Ciudad de Buenos Aires (AR); Gabriel Tirado, Houston, TX (US); Marcelo Gomes de Souza, Rio de Janeiro (BR); Damian Martinez, Bogota (BR); Henrique de Azevedo Araujo, Rio de Janeiro (BR); Cristian Fattori, Houston, TX (US)

(73) Assignee: Landmark Graphics Corporation, Houston, TX (US)

( * ) Notice: Subject to any disclaimer, the term of this patent is extended or adjusted under 35 U.S.C. 154(b) by 319 days.

(21) Appl. No.: 17/404,446

(22) Filed: Aug. 17, 2021

(65) Prior Publication Data

US 2023/0058683 A1  Feb. 23, 2023

(51) Int. Cl.
*G06Q 10/0639* (2023.01)
*E21B 44/00* (2006.01)
*G06Q 50/02* (2024.01)

(52) U.S. Cl.
CPC ......... *E21B 44/00* (2013.01); *G06Q 10/0639* (2013.01); *G06Q 50/02* (2013.01); *E21B 2200/20* (2020.05); *E21B 2200/22* (2020.05)

(58) Field of Classification Search
CPC .... E21B 44/00; E21B 2200/20; E21B 220/22; G06Q 10/0639; G06Q 50/02
See application file for complete search history.

(56) References Cited

U.S. PATENT DOCUMENTS

| 7,539,625 | B2* | 5/2009 | Klumpen ......... G06Q 10/06312 705/7.22 |
| 11,131,184 | B1* | 9/2021 | Alali ....................... E21B 47/04 |
| 2007/0199721 | A1 | 8/2007 | Givens et al. |

(Continued)

FOREIGN PATENT DOCUMENTS

| CN | 108756848 A | * 11/2018 | ............. E21B 44/00 |
| WO | 2019173841 A1 | 9/2019 | |

OTHER PUBLICATIONS

Barbosa et al. "Machine learning methods applied to drilling rate of penetration prediction and optimization"(2019) (https://www.sciencedirect.com/science/article/pii/S0920410519307533) (Year: 2019).*

(Continued)

*Primary Examiner* — Sujay Koneru
(74) *Attorney, Agent, or Firm* — Kilpatrick Townsend & Stockton LLP

(57) ABSTRACT

A method includes acquiring historical well construction data associated with a set of historical wells. The method also includes developing a well construction model using the corpus of historical well construction data. Additionally, the method includes acquiring real-time well construction data during a well construction operation and applying the well construction model to the real-time well construction data to identify changes to a well construction parameter. Further, the method includes outputting a command to update the well construction operation using the changes to the well construction parameter.

18 Claims, 6 Drawing Sheets

(56) References Cited

U.S. PATENT DOCUMENTS

| | | | | |
|---|---|---|---|---|
| 2013/0076526 | A1* | 3/2013 | Schuberth | E21B 47/007 340/853.8 |
| 2014/0116776 | A1 | 5/2014 | Marx et al. | |
| 2015/0300151 | A1* | 10/2015 | Mohaghegh | E21B 47/07 702/9 |
| 2015/0330204 | A1* | 11/2015 | Hildebrand | E21B 44/04 700/282 |
| 2016/0186551 | A1* | 6/2016 | Dykstra | E21B 44/00 175/24 |
| 2016/0281497 | A1* | 9/2016 | Tilke | E21B 47/00 |
| 2018/0204139 | A1 | 7/2018 | Burch et al. | |
| 2018/0230781 | A1* | 8/2018 | Garcia | E21B 41/00 |
| 2019/0293824 | A1* | 9/2019 | Liu | E21B 44/00 |
| 2019/0310391 | A1* | 10/2019 | Ramurthy | G01V 20/00 |
| 2019/0390547 | A1* | 12/2019 | Pietrzyk | G05B 15/02 |
| 2020/0293971 | A1* | 9/2020 | Moynet | G06Q 10/20 |

OTHER PUBLICATIONS

International Application, International Search Report and Written Opinion, PCT/US2021/046880, Apr. 20, 2022, 9 pages.

Domingos, "A Few Useful Things to Know about Machine Learning", Communications of the ACM, vol. 55, No. 10, Oct. 2012, pp. 78-87.

Energistics, "Oil & Gas Data", available on the internet at https://www.energistics.org at least as early as Mar. 17, 2021, 5 pages.

Hu et al., "Toward Controlled Generation of Text", Proceedings of the 34th International Conference on Machine Learning, Sydney, Australia, 2017, 10 pages.

Influxdata, "Act in Time. Build on InfluxDB.", available on the internet at https://www.influxdata.com at least as early as Mar. 17, 2021, 9 pages.

Jordon et al., "Pate-Gan: Generating Synthetic Data with Differential Privacy Guarantees", ICLR Conference, 2019, 21 pages.

Keycloak, "Open Source Identity and Access Management Solution", available on the internet at https://www.keycloak oro/about html at least as early as Mar. 17, 2021, 5 pages.

Killick et al., "Optimal Detection of Changepoints with a Linear Computation Cost", Journal of the American Statistical Association, 107:500, 2012, pp. 1590-1598.

Lemke et al., "Metalearning, A Survey of Trends and Technologies", Artificial Intelligence Review, vol. 44, Jul. 20, 2013, pp. 117-130.

Mathis et al., "Mastering Real-Time Data Quality Control-How to Measure and Manage the Quality of (Rig) Sensor Data", SPE/IADC Middle East Drilling Technology Conference & Exhibition, Cairo, Egypt, Oct. 22-24, 2007, 10 pages.

Pereira et al., "Validating Drilling States Classifiers with Suboptimal Datasets", Offshore Technology Conference, Houston, TX, May 6-9, 2019, 5 pages.

Pfahringer et al., "Meta-Learning by Landmarking Various Learning Algorithms", Proceedings of the Seventeenth International Conference on Machine Learning (ICML 2000), Stanford University, Stanford, CA, 2000, 8 pages.

Rokach, "Ensemble-based Classifiers", Artificial Intelligence Review, vol. 33, 2010, 39 pages.

* cited by examiner

WELL CONSTRUCTION OPTIMIZATION TECHNIQUES

TECHNICAL FIELD

The present disclosure relates generally to constructing wells in a subterranean environment. More specifically, but not by way of limitation, this disclosure relates to reducing wellbore construction inefficiencies using historical and real-time well construction data trends.

BACKGROUND

A well system, such as an oil and gas well system, may include a wellbore drilled through subterranean formation. The subterranean formation may include a rock matrix permeated by oil or gas that is to be extracted using the well system. During the construction operation of the well system, inefficiencies may be introduced that slow down the construction timeline of the well system. These inefficiencies may be difficult to track and correct due to inaccuracies associated with manual input of data into well construction reports. Slowing of the construction timeline due to the inefficiencies may result in increased costs for constructing the well system.

DETAILED DESCRIPTION

Figure 1:
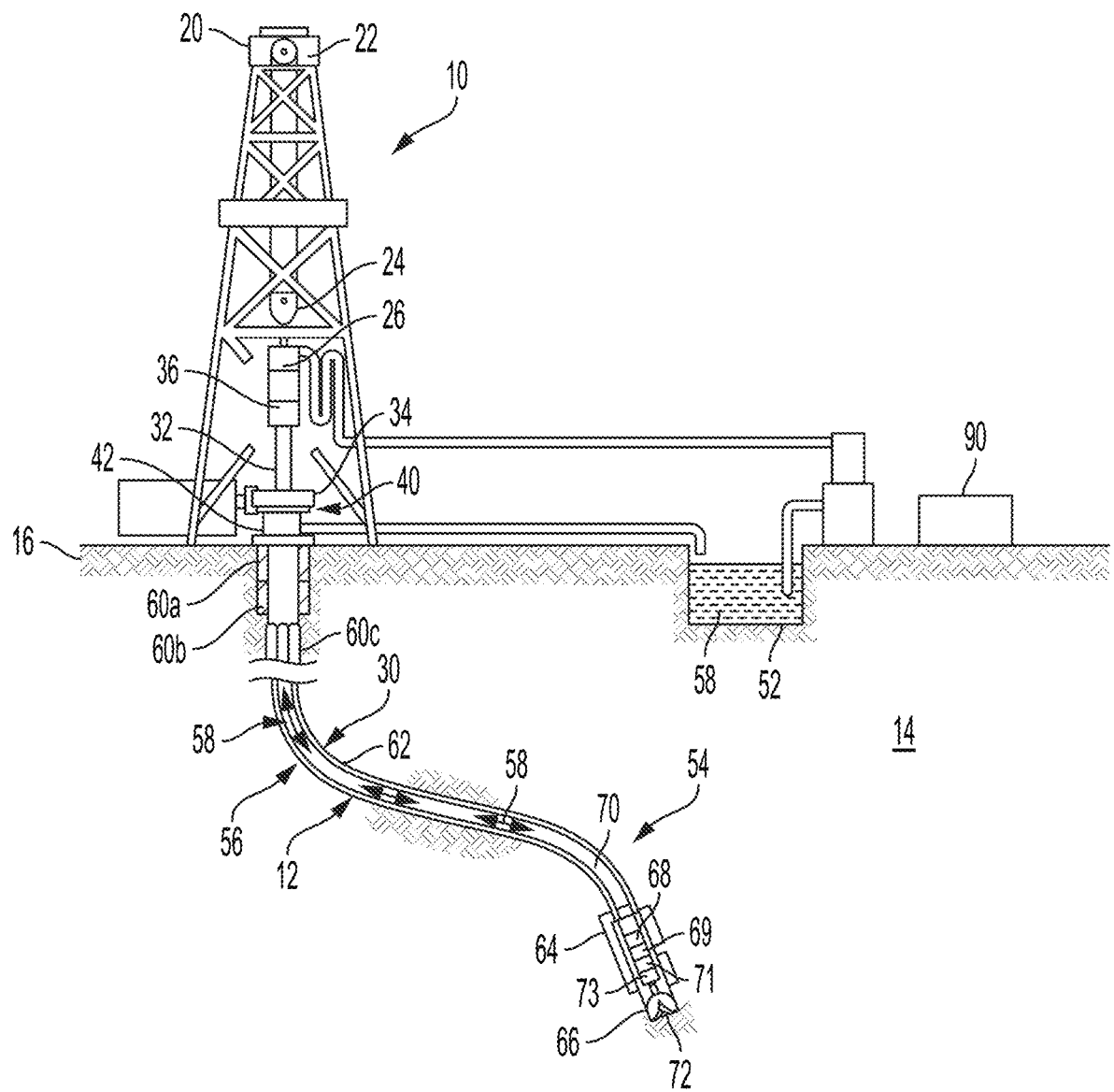
FIG. 1 is a cross-sectional view of a well system incorporating a well construction optimization system according to some examples of the present disclosure.

Certain aspects and features relate to techniques for optimizing a wellbore construction operation. For example, the techniques can rely on historical and real-time well construction data to improve timelines for completing construction of a wellbore. Construction of the wellbore may involve transporting equipment to a well site, installing equipment at the well site, drilling the wellbore, completing the well, and performing any additional operations on the wellbore up to the point of oil and gas production. The techniques may leverage the historical and real-time well construction data to generate instructions for controlling components of the well construction operation in a manner that minimizes non-productive or inefficient time.

Appropriately classified well construction data may provide a detailed performance analysis related to operations of a well construction crew, well construction rigs, and well construction service companies. The well construction data may also provide further insights regarding work from a performance standpoint. Mechanisms to automate rig activity detection and reporting may improve future well construction operations. Further, application of data analytics based on real-time data to support well construction operations may provide opportunities to improve operational performance of current and future well construction operations.

In some examples, a well construction optimizer may include a rig activity detection module, a retro-analysis module, an auto-reporting module, and an invisible lost time analysis module. The modules may leverage historical well construction data and real-time well construction data to analyze current well construction operations and provide an output to control various parameters of the current well construction operations to reduce well construction inefficiencies. Further, the real-time well construction data and the results of the parameter control may also be leveraged to provide enhanced robustness to a well construction model used to analyze the current well construction operations. In some examples, the model may be a Petri net that is provided as an input to process mining algorithms. The process mining algorithms may be used to identify deviations and bottlenecks from planned operations and to provide recommendations for improvements to the planned operations. In some examples, the recommendations for improvements may be provided or otherwise accessed by an automated well construction system for use to control well construction parameters, such as drilling operations or well completion operations.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

FIG. 1 is a cross-sectional view of a well system 10 incorporating a well construction optimization system 90 according to some examples of the present disclosure. The well system 10 can include a wellbore 12 extending through various earth strata in a formation 14 (e.g., a subterranean formation) located below a well surface 16. The wellbore 12 may be formed of a single bore or multiple bores extending into the formation 14, and disposed in any orientation. The well system 10 can include a derrick or drilling rig 20. The drilling rig 20 may include a hoisting apparatus 22, a travel block 24, and a swivel 26 for raising and lowering casing, drill pipe, coiled tubing, and other types of pipe or tubing strings or other types of conveyance vehicles, such as wireline, slickline, and the like. The wellbore 12 can include a drill string 30 that is a substantially tubular, axially-extending drill string formed of drill pipe joints coupled together end-to-end.

The drilling rig 20 may include a kelly 32, a rotary table 34, and other equipment associated with rotation or translation of drill string 30 within the wellbore 12. For some applications, the drilling rig 20 may also include a top drive unit 36. The drilling rig 20 may be located proximate to a wellhead 40, as shown in FIG. 1, or spaced apart from the wellhead 40, such as in the case of an offshore arrangement. One or more pressure control devices 42, such as blowout preventers (BOPs) and other well equipment may also be provided at wellhead 40 or elsewhere in the well system 10.

A drilling or service fluid source 52 may supply a drilling fluid 58 pumped to the upper end of the drill string 30 and flowed through the drill string 30. The fluid source 52 may supply any fluid utilized in wellbore operations, including drilling fluid, drill-in fluid, acidizing fluid, liquid water, steam, or some other type of fluid.

The well system 10 may have a pipe system 56. For purposes of this disclosure, the pipe system 56 may include casing, risers, tubing, drill strings, subs, heads or any other pipes, tubes or equipment that attaches to the foregoing, such as the drill string 30, as well as the wellbore and laterals in which the pipes, casing, and strings may be deployed. In this regard, the pipe system 56 may include one or more casing strings 60 cemented in the wellbore 12, such as the surface 60a, intermediate 60b, and other casing strings 60c shown in FIG. 1. An annulus 62 is formed between the walls of sets of adjacent tubular components, such as concentric and non-concentric casing strings 60 or the exterior of drill string 30 and the inside wall of the wellbore 12 or the casing string 60c.

Where the subsurface equipment 54 is used for drilling and the conveyance vehicle is a drill string 30, the lower end of the drill string 30 may include a bottom hole assembly 64, which may carry at a distal end a drill bit 66. During drilling operations, a weight-on-bit is applied as the drill bit 66 is rotated, thereby enabling the drill bit 66 to engage the formation 14 and drill the wellbore 12 along a predetermined path toward a target zone. In general, the drill bit 66 may be rotated with the drill string 30 from the drilling rig 20 with the top drive unit 36 or the rotary table 34, or with a downhole mud motor 68 within the bottom hole assembly 64.

The bottom hole assembly 64 or the drill string 30 may include various other tools, including a power source 69, a rotary steerable system 71, and measurement equipment 73, such as measurement while drilling (MWD) or logging while drilling (LWD) instruments, sensors, circuits, or other equipment to provide information about the wellbore 12 or the formation 14, such as positioning, logging, or measurement data from the wellbore 12. While FIG. 1 describes the system using a rotary steerable system, any directional steering can be used including a directional motor system.

Measurement data and other information from the tools may be communicated using electrical signals, acoustic signals, or other telemetry that can be received at the well construction optimization system 90 at the well surface 16 to, among other things, monitor the performance of the drill string 30, the bottom hole assembly 64, and the associated drill bit 66, as well as monitor the conditions of the environment to which the bottom hole assembly 64 is subjected (e.g., drilling fluid 58 flow rate, formation characteristics, etc.).

The drilling fluid 58 may be pumped to the upper end of drill string 30 and flow through a longitudinal interior 70 of the drill string 30, through the bottom hole assembly 64, and exit from nozzles formed in the drill bit 66. At the bottom end 72 of the wellbore 12, the drilling fluid 58 may mix with formation cuttings, formation fluids (e.g., fluids containing gasses and hydrocarbons), and other downhole fluids and debris. The drilling fluid mixture may then flow in an uphole direction through an annulus 62 to return formation cuttings and other downhole debris to the well surface 16.

After drilling through a portion of the formation 14 or while drilling through the formation 14, the measurement equipment 73 can provide survey feedback to the well construction optimization system 90. In some examples, the well construction optimization system 90 can analyze the survey feedback from the measurement equipment 73 to determine adjustments to make to the operation of the drill bit 66 or to other components of the well construction operation. The survey feedback information from the measurement equipment 73 can also provide information about formation characteristics of the formation 14 to the well construction optimization system 90. In some examples, the well construction optimization system 90 uses the real-time data obtained from the measurement equipment 73 and any other sensors associated with the well system 10 in conjunction with a corpus of historical well construction data associated with other similar wells to determine well construction parameter adjustments. The well construction parameters that are adjustable by the well construction optimization system 90 may include drilling speed, weight-on-bit, drill bit trajectory, composition of the drilling fluid 58, hydraulic fracturing pressure, composition of other wellbore fluids, or any other adjustable parameters that may impact the construction of the well system 10. Additionally, while FIG. 1 depicts the well construction optimization system 90 operating in a land-based drilling environment, the well construction optimization system 90 may also be implemented in an offshore drilling environment.

Figure 2:
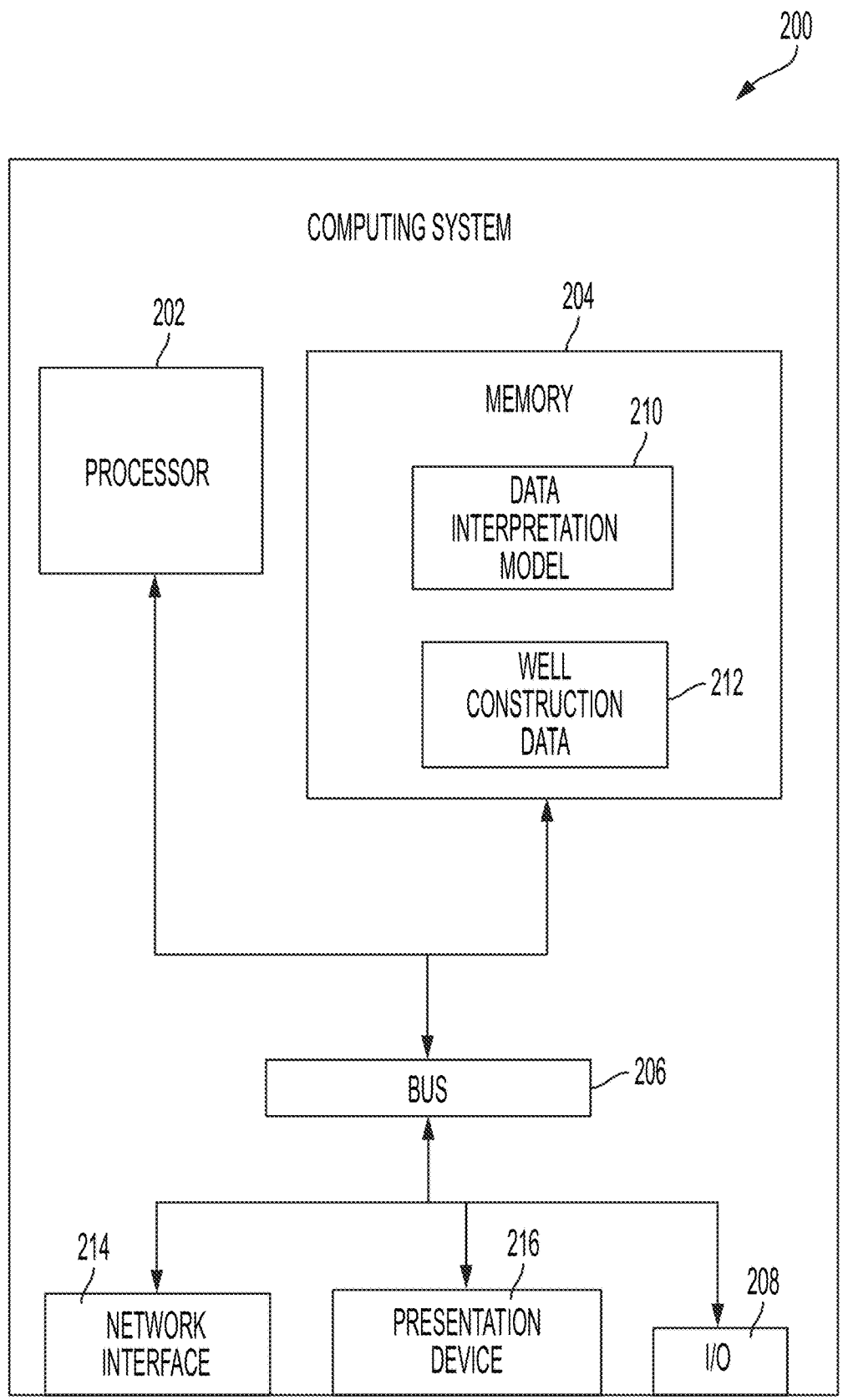
FIG. 2 is a block diagram of a computing system functioning as the well construction optimization system according to one aspect of the present disclosure.

FIG. 2 is a block diagram of a computing system 200 that may function as the well construction optimization system 90 for performing various operations described with respect to FIGS. 1 and 3-6, according to one aspect of the present disclosure. In some embodiments, the computing system 200 may be the complete well construction optimization system 90, as depicted in FIG. 2. In other embodiments, separate computing systems having devices similar to those depicted in FIG. 2 (e.g., a processor, a memory, etc.) may separately function as the well construction optimization system 90.

The depicted example of a computing system 200 includes a processor 202 communicatively coupled to one or more memory devices 204. The processor 202 may execute computer-executable program code stored in a memory device 204, accesses information stored in the memory device 204, or both. Examples of the processor 202 can include a microprocessor, an application-specific integrated circuit ("ASIC"), a field-programmable gate array ("FPGA"), or any other suitable processing device. The processor 202 can include any number of processing devices, including a single processing device.

The memory device 204 may include any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 200 may also include a number of external or internal devices, such as input or output devices. For example, the computing system 200 is shown with one or more input/output ("I/O") interfaces 208. An I/O interface 208 can receive input from input devices or provide output to output devices. One or more buses 206 may also be included in the computing system 200. The bus 206 may communicatively couple one or more components of the computing system 200.

The computing system 200 executes program code that configures the processor 202 to perform one or more of the operations described herein. The program code may include, for example, a data interpretation model 210 and any other suitable applications that perform one or more operations described herein. The program code may be resident in the memory device 204 or any suitable computer-readable medium and may be executed by the processor 202 or any other suitable processor. In additional or alternative embodiments, the program code described above is stored in one or more other memory devices accessible via a data network.

The memory device 204 may also store a set of well construction data 212. The well construction data 212 may include data obtained from sensors in the well that is under construction and data obtained from historical wells. The historical wells may be selected based on similarities of the historical wells to characteristics of the well under construction. For example, the historical wells may be selected based on formation geology, geographical proximity, or any other features that are common between the historical wells and the well under construction. Additionally, the well construction data 212 may include real-time and near real-time well construction data obtained from the sensors and reports associated with the well under construction.

The computing system 200 also includes a network interface device 214. The network interface device 214 includes any device or group of devices suitable for establishing a wired or wireless data connection to one or more data networks. Non-limiting examples of the network interface device 214 include an Ethernet network adapter, a modem, and/or the like. The computing system 200 is able to communicate with one or more other computing devices via a data network using the network interface device 214.

In some embodiments, the computing system 200 may also include a presentation device 216. The presentation device 216 can include any device or group of devices suitable for providing visual, auditory, or other suitable sensory output. Non-limiting examples of the presentation device 216 include a touchscreen, a monitor, a speaker, a separate mobile computing device, etc. In some aspects, the presentation device 216 can include a remote client-computing device that communicates with the computing system 200 using one or more data networks described herein. Other aspects can omit the presentation device 216.

Figure 3:
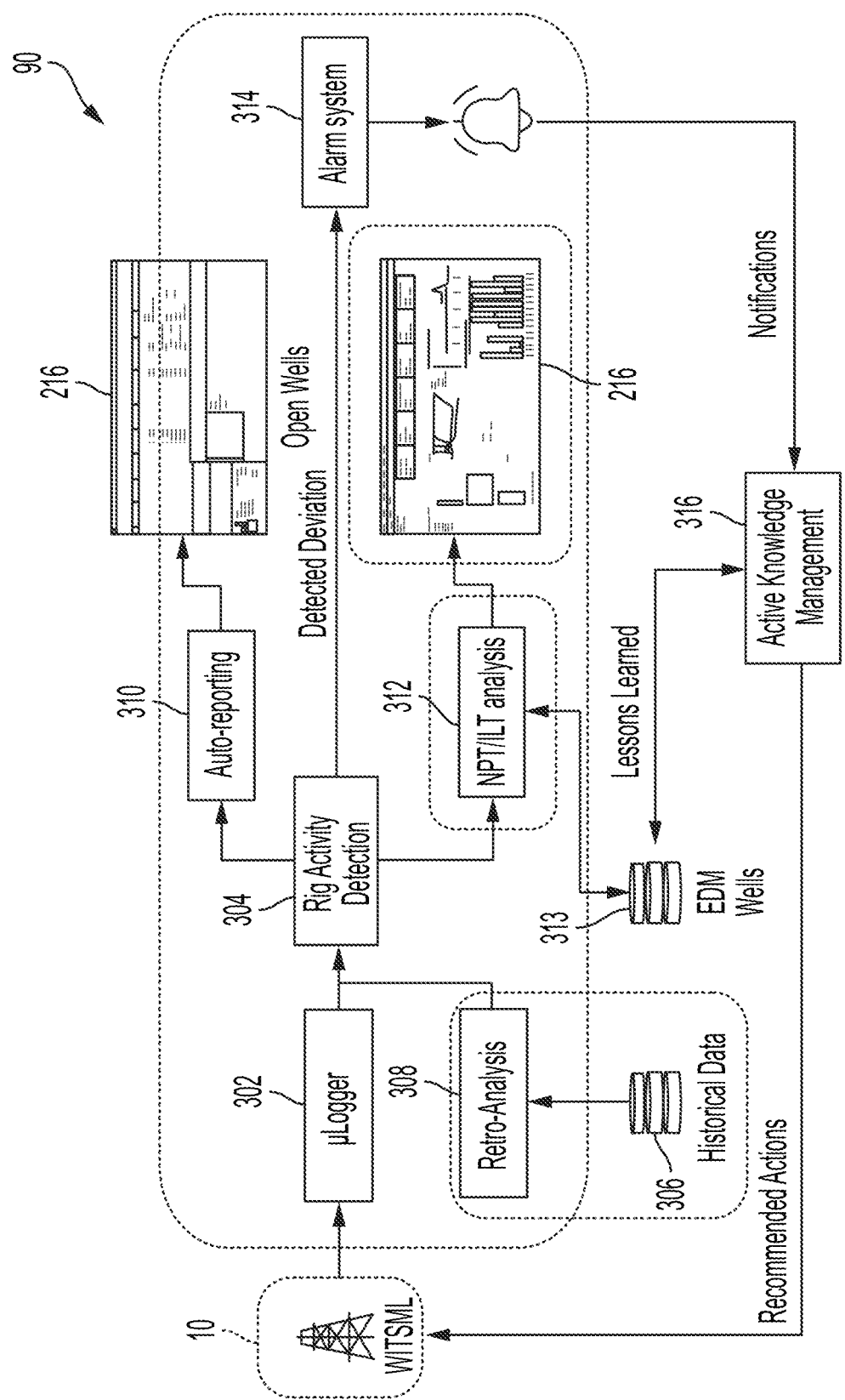
FIG. 3 is a block diagram of the well construction optimization system according to one aspect of the present disclosure.

FIG. 3 is a block diagram of the well construction optimization system 90 according to one aspect of the present disclosure. Components of the well system 10, such as sensors, may collect well construction data at the well site during construction of the well system 10. The well construction data may be compiled in a wellsite information transfer standard markup language (WITSML) and accessed by a micro-logger 302. The well construction data accessed by the micro-logger 302 may be accessed in real-time or near real-time. The micro-logger 302 may also access other data sources related to well construction. For example, the micro-logger 302 may access well construction data that is part of an enterprise data management (EDM) system, an energy transfer partners (ETP) system, or any other data management or compilation system associated with construction of the well system 10.

The micro-logger 302 may compile the well construction data, which is then accessed by a rig activity detection module 304. In addition to the real-time well construction data, a corpus of historical well construction data 306 may also be compiled. For example, the historical well construction data 306 may be compiled from information collected during well construction operations of well sites with characteristics similar to the present well construction operation. A retro-analysis module 308 may analyze the corpus of historical data 306 to determine an estimated technical limit timeline for the construction of the well system 10. The estimated technical limit timeline may be the minimum amount of time for constructing the well system 10 based on the present technical limitations to well construction operations. For example, the technical limit timeline may be an estimation of well construction time under conditions that all operations will be performed perfectly by a group of experts who have experience drilling similar wells in a similar field. In some examples, the retro-analysis module 308 uses a machine-learning model trained on historical well construction data or rules-based modelling to generate the technical limit timeline for the well construction. In some examples, the technical limit timeline may include well construction benchmarks that indicate the technical limit timing for completing specified tasks that are part of the well construction operation.

The rig activity detection module 304 may access the output from the retro-analysis module 308 to analyze the real-time information from the well system 10 in view of the technical limit timeline identified by the retro-analysis module 308. This analysis by the rig activity detection module 304 may provide a mechanism for understanding the well construction data obtained from the well system 10. In some examples, the analysis includes rules-based modeling of the well construction activity to identify deviations from the technical limit timeline established by the retro-analysis module 308. Additionally, the analysis provided by the rig activity detection module 304 may rely on machine-learning models to identify deviations from the technical limit timeline established by the retro-analysis module 308. In some examples, the model may be a Petri net that is provided as an input to process mining algorithms. The process mining algorithms may be used to identify deviations and bottlenecks from planned operations and to provide recommendations for improvements to the planned operations.

In an example, the output of the rig activity detection module 304 may be provided to an auto-reporting module 310. The auto-reporting module 310, which may replace human-generated daily drilling reports (DDRs), may generate well construction reports that are output to a well operator on the presentation device 216. In some examples, the auto-reporting module 310 may perform filtering operations on the data received from the rig activity detection module 304 to minimize data fatigue as a result of an amount of raw data presented on the display device 216.

The output of the rig activity detection module 304 may also be provided to a non-productive time and invisible lost time (NPT/ILT) analysis module 312. The NPT/ILT analysis module 312 may identify non-productive time and invisible lost time during well construction operations at the well system 10. In some examples, the NPT/ILT analysis module 312 may also leverage information provided by an enterprise data management system 313. Non-productive time identified by the NPT/ILT analysis module 312 may include time when drilling operations are interrupted for any reason. Invisible lost time identified by the NPT/ILT analysis module 312 may include lost time compared to technical limit timeline that is attributable to activity not included in a conventional report.

The NPT/ILT analysis module 312 may leverage machine-learning models or rules-based modeling to identify the non-productive time and invisible lost time of the well construction operation. In some examples, the analysis is only performed by the NPT/ILT analysis module 312 when the rig activity detection module 304 detects a deviation of the well construction operation from the technical limit timeline. In addition to performing the NPT/ILT analysis, an alarm system 314 may be activated when the deviation from the technical limit timeline occurs. The alarm system 314 may prompt the well construction optimization system 90 to take remedial action in an attempt to improve the well construction operation.

In an example, the NPT/ILT analysis module 312 may output results of the analysis to the display device 216. A well operator may be able to access this output to track the well construction operation. Additionally, the NPT/ILT analysis module 312 may output results of the analysis to the enterprise data management system 313. In an example, the enterprise data management system 313 may store construction lessons learned from historical well construction operations, and the enterprise data management system 313 may store indications of actions taken and results of the actions taken during the present well construction operation.

In this manner, an active knowledge management system 316 may analyze the data in the enterprise data management system 313 to determine an appropriate course correction for the present well construction operation when the alarms system 314 indicates a deviation from the technical limit timeline of the well construction operation. In some examples, the active knowledge management module 316 may implement a similar correction to one that was successfully performed in an existing well under similar circumstances. In one or more examples, the active knowledge management module 316 may develop corrections or well construction parameter adjustments using rules-based models or using machine-learning models trained using the historical well construction data 306, the data stored in the enterprise data management system 313, or a combination thereof.

The active knowledge management module 316 may provide the corrections or well construction parameter adjustments to the well system 10 for implementation. In other words, the active knowledge management module 316 may provide instructions to the well system 10 to fix a problem that resulted in the deviation from the technical limit timeline. In some examples, the well system 10 or portions of the well system 10 may be automated. Accordingly, the well construction parameter adjustments may be automatically implemented at the well system 10 to change the well construction operation in a manner that minimizes or otherwise reduces non-productive time, invisible lost time, or both.

Figure 4:
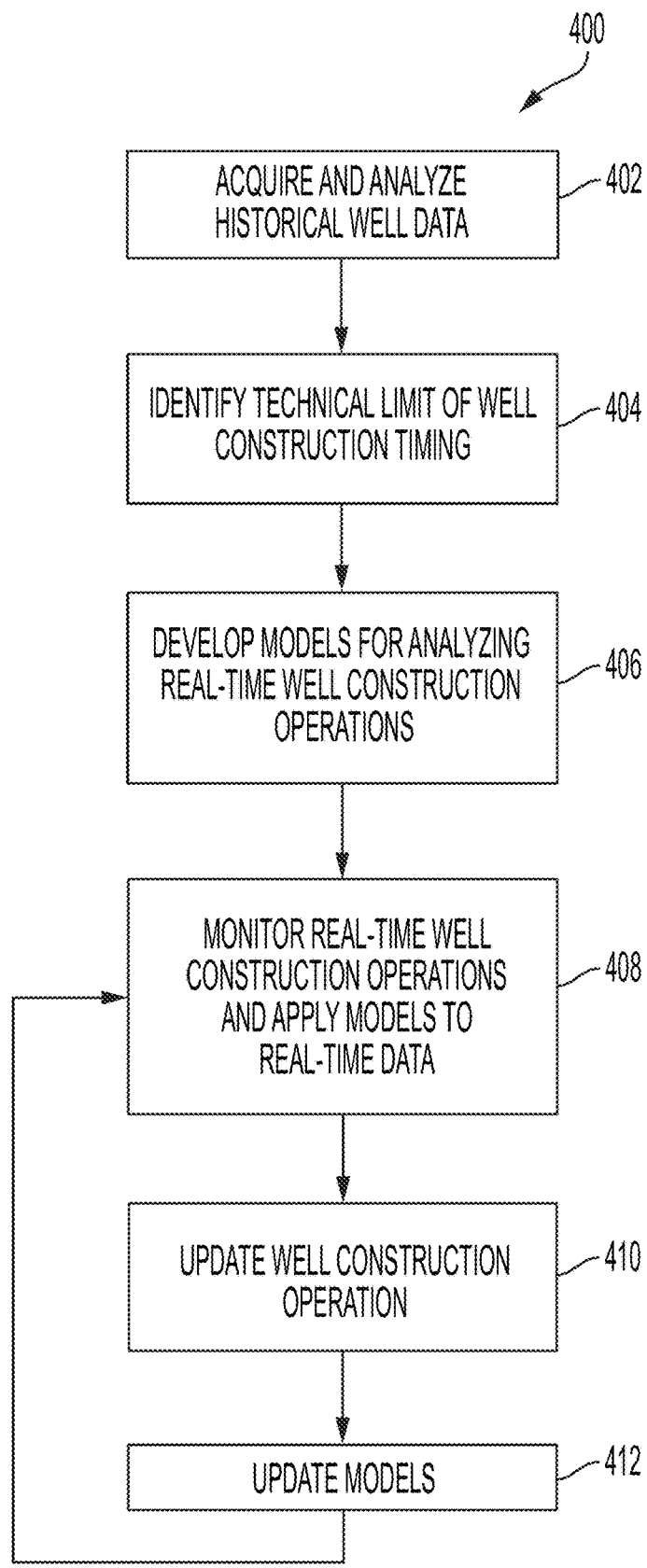
FIG. 4 is a flowchart describing a process for controlling a well construction operation according to one aspect of the present disclosure.

FIG. 4 is a flowchart describing a process 400 for controlling a well construction operation according to one aspect of the present disclosure. The computing device 200, which may operate as the well construction optimization system 90, may perform the operations described in the process 400.

At block 402, the computing device 200 may acquire and analyze historical well data. The historical well data may include well construction data associated with the construction of wells with similar characteristics to a well under construction. For example, the historical well data may be from wells with similar geologies or in similar geographical areas to the well under construction. Analysis of the historical well data may include breaking historical well construction operations down into timelines for well construction stages. Further, the analysis of the historical well data may involve updating the corpus of well construction data by removing a set of well construction data that is not compatible with a well system constructed by the well construction operation. For example, well construction data associated with wells that include different geologies or geographies may be removed from the corpus of well construction data.

At block 404, the computing device 200 may identify a technical limit of well construction timing. The technical limit of well construction timing may be a limit to how quickly a well can be constructed based on the technology available at the time of identifying the technical limit. In some examples, the historical well data may include benchmark activities that can be analyzed for construction of each well. One technique for generating the technical limit timeline is identifying the best performance time for each of the benchmark activities among all of the well included in the historical well data. The best performance times can be aggregated to generate a composite well. Through historical analysis of the historical well data, further improvements to the composite well can be made to identify the technical limit timeline for the well construction operation. For example, known non-productive time from the historical well data may be removed from the composite well timeline to generate the technical limit timeline.

At block 406, the computing device 200 may develop models to analyze real-time well construction operations. In an example, the models may include rules-based models, machine-learning models, or a combination thereof. The models may be generated to analyze the real-time data of a well construction operation in view of the technical limit timeline. For example, the models may be used to identify a deviation from the technical limit timeline. Additionally, one or more of the models may be used to identify well construction parameter adjustments to control subsequent well construction operations to minimize non-productive time, invisible lost time, or both. In some examples, the models may leverage historical well construction data to influence decisions made based on the real-time data of the current well construction operation.

At block 408, the computing device 200 may monitor the real-time well construction operations and apply the models to the real-time well construction data. Applying the model or models generated at block 406 to the real-time well construction data may generate an output that indicates a deviation from the technical limit timeline. In some examples, one or more of the models may also output well construction parameter adjustments to control parameters of the well construction operation.

At block 410, the computing device 200 may provide instructions to the well system 10 to update the well construction operation. The instructions may be instructions that identify a well construction parameter and a desired change to the parameter. For example, the instruction may instruct a drilling operation to increase a drilling rate. Other well construction parameters may also be adjusted based on the instructions to update the well construction operation.

At block 412, the computing device 200 may update the models generated at block 406 based on the real-time data collected at block 408 and the instructions provided by the computing device 200 to update the well construction operation. Upon updating the models, the computing device 200 may again monitor real-time well construction operations for further well construction updates at block 408.

Figure 5:
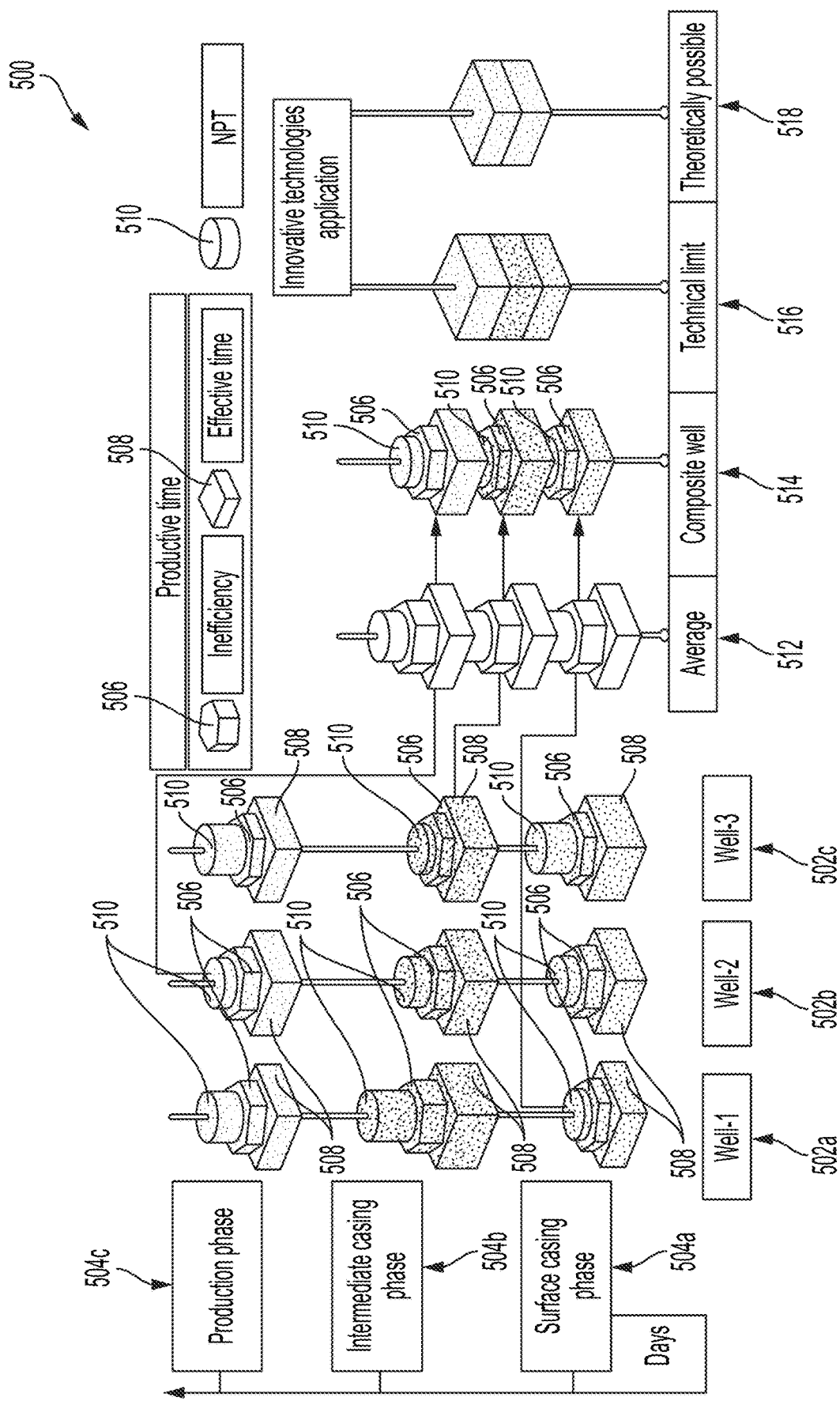
FIG. 5 is a diagram describing a composite well construction timeline according to one aspect of the present disclosure.

FIG. 5 is a diagram describing a simplified composite well construction timeline 500 according to one aspect of the present disclosure. As shown, the timeline begins with well construction data associated with the construction of three historical wells 502a, 502b, and 502c. While the well construction data associated with three wells is described in FIG. 6 to generate the timeline 500, the well construction data from more or fewer wells may also be used. The well construction data for each of the wells 502*a*, 502*b*, and 502*c* provides information about time spent during various phases of the well construction operation. As illustrated, the timeline 500 provides an indication of an amount of time spent for each of the wells 502*a*, 502*b*, and 502*c* during a surface casing phase 504*a*, during an intermediate casing phase 504*b*, and during a production phase 504*c* of the well construction operation. As mentioned above, the well construction operation may be divided into hundreds of benchmarks, and the timeline 500 is simplified by representing only three phases 504*a*, 504*b*, and 504*c*.

During the phases 504*a*, 504*b*, and 504*c*, productive time and non-productive time for each of the wells 502*a*, 502*b*, and 502*c* is illustrated. For example, the productive time may include inefficiencies 506 and effective time 508 for each of the phases of each of the wells. Non-productive time 510 is also depicted for each of the phases of each of the wells.

Several timelines may be generated from this information. For example, an average timeline 512 for well construction may be generated by averaging the values for each phase across the three wells. Further, a composite well timeline 514 may be generated by selecting the most efficient well for each of the phases and compiling those timelines. To obtain a technical limit timeline 516, the inefficiencies 506 and the non-productive time 510 are removed from the composite well timeline 514. In some examples, the potential application of innovative technologies may be considered to generate a theoretically possible timeline 518 for construction of the well.

Figure 6:
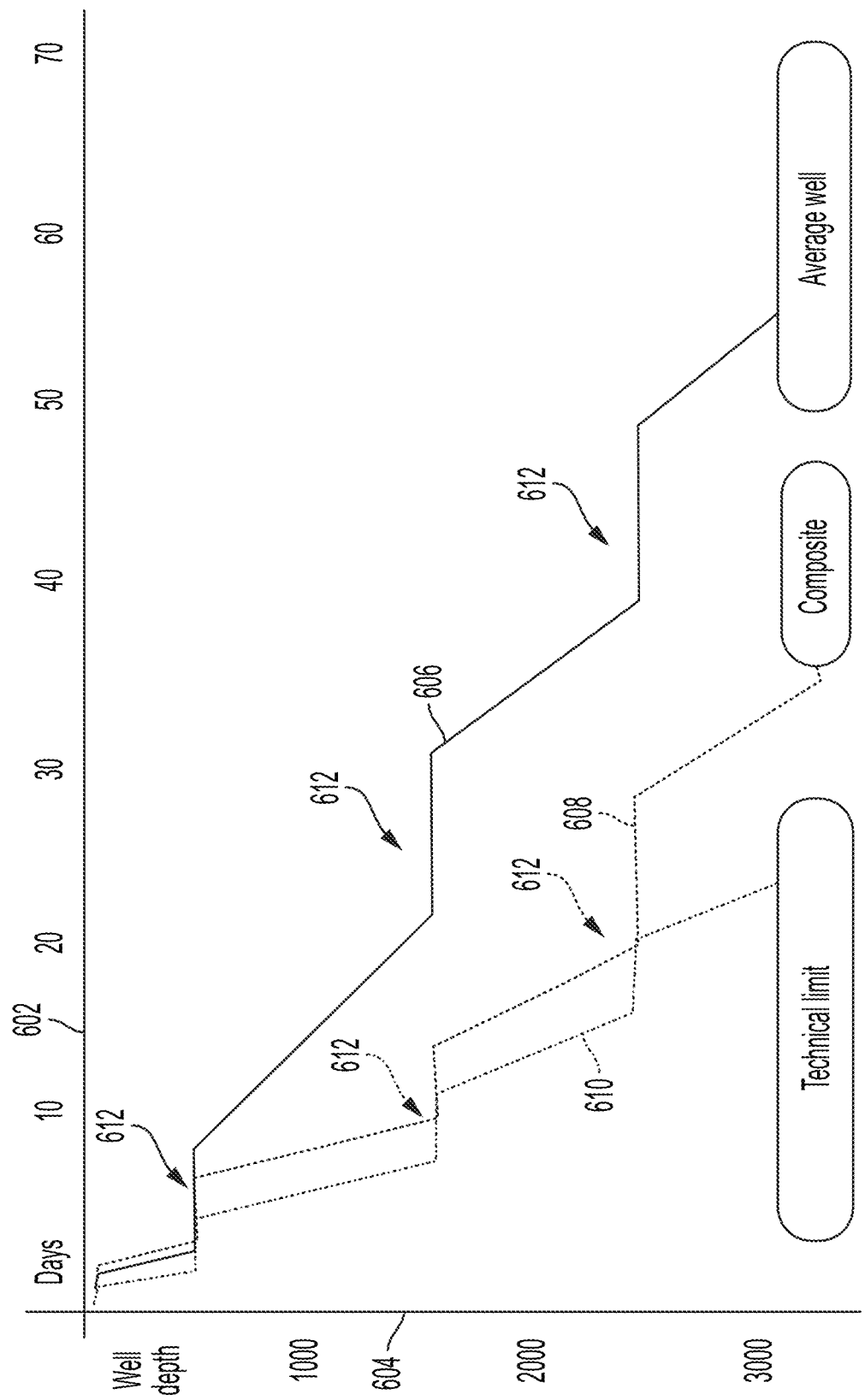
FIG. 6 is a diagram demonstrating well construction timelines according to one aspect of the present disclosure.

FIG. 6 is a diagram demonstrating well construction timelines according to one aspect of the present disclosure. An x-axis 602 provides an indication of a number of days, and a y-axis 604 provides an indication of well depth. As illustrated, a line 606 represents an average well timeline, such as the timeline 512 in FIG. 5. A line 608 represents a composite timeline, such as the timeline 514 in FIG. 5. Further, a line 610 represents a technical limit timeline, such as the timeline 516 in FIG. 5.

The composite timeline represented by the line 608 may be generated by combining the most efficient phases of well construction from a set of historical well construction data. The technical limit timeline represented by the line 610 may be generated by removing inefficiencies and non-productive time from the composite timeline. In an example, inefficiencies may occur during productive time, such as during drilling of the well. Inefficiencies may be removed by, for example, increasing a drilling rate during a drilling phase of the well construction operation when a determination is made that the drilling rate can increase without corresponding adverse effects. Other well construction parameters may also be adjusted to remove inefficiencies. The inefficiencies may be represented by shallower slopes of the lines 606, 608, and 610.

Additionally, non-productive time may occur when well construction is not actively occurring. The non-productive time may be indicated by horizontal portions 612 of the lines 606, 608, and 610. The horizontal portions may indicate that a drilling portion of the well construction operation has stopped. In some examples, limiting drilling downtime, such as by scheduling part deliveries in advance or improving well surface efficiencies, may improve the well construction timeline such that the technical limit timeline is obtained.

In some aspects, a method, system, and a computing environment for controlling a well construction operation are provided according to one or more of the following examples:

As used below, any reference to a series of examples is to be understood as a reference to each of those examples disjunctively (e.g., "Examples 1-4" is to be understood as "Examples 1, 2, 3, or 4").

Example 1 is a method comprising: acquiring a corpus of historical well construction data associated with a set of historical wells; developing a well construction model using the corpus of historical well construction data; acquiring real-time well construction data during a well construction operation; applying the well construction model to the real-time well construction data to (i) identify well construction inefficiencies and (ii) generate changes to a well construction parameter; and outputting a command to update the well construction operation using the changes to the well construction parameter.

Example 2 is the method of example 1, further comprising: identifying a technical limit of well construction timing using the corpus of historical well construction data, wherein the well construction model is further developed using the technical limit of well construction timing.

Example 3 is the method of example 1, further comprising: updating the well construction model using the real-time well construction data and the changes to the well construction parameter.

Example 4 is the method of example 1, wherein the well construction parameter comprises drilling parameters of the well construction operation.

Example 5 is the method of example 1, wherein applying the well construction model to the real-time well construction data further identifies causes of the well construction inefficiencies of the well construction operation.

Example 6 is the method of example 1, wherein developing the well construction model comprises training a machine-learning model using the corpus of historical well construction data.

Example 7 is the method of example 1, further comprising: updating the corpus of historical well construction data to remove a set of well construction data that is not compatible with a well system constructed by the well construction operation.

Example 8 is a system comprising: a processor; and a non-transitory memory device communicatively coupled to the processor comprising instructions that are executable by the processor to cause the processor to perform operations comprising: acquiring a corpus of historical well construction data associated with a set of historical wells; developing a well construction model using the corpus of historical well construction data; acquiring real-time well construction data during a well construction operation; applying the well construction model to the real-time well construction data to (i) identify well construction inefficiencies and (ii) generate changes to a well construction parameter; and outputting a command to update the well construction operation using the changes to the well construction parameter.

Example 9 is the system of example 8, wherein the operations further comprise: identifying a technical limit of well construction timing using the corpus of historical well construction data, wherein the well construction model is further developed using the technical limit of well construction timing.

Example 10 is the system of any of examples 8-9, wherein the operations further comprise: updating the well construction model using the real-time well construction data and the changes to the well construction parameter.

Example 11 is the system of any of examples 8-9, wherein the well construction parameter comprises drilling parameters of the well construction operation.

Example 12 is the system of any of examples 8-9, wherein applying the well construction model to the real-time well construction data further identifies causes of the well construction inefficiencies of the well construction operation.

Example 13 is the system of any of examples 8-9, wherein developing the well construction model comprises training a machine-learning model using the corpus of historical well construction data.

Example 14 is the system of any of examples 8-9, further comprising: updating the corpus of historical well construction data to remove a set of well construction data that is not compatible with a well system constructed by the well construction operation.

Example 15 is a non-transitory computer-readable medium that includes instructions that are executable by a processing device to perform operations comprising: acquiring a corpus of historical well construction data associated with a set of historical wells; developing a well construction model using the corpus of historical well construction data; acquiring real-time well construction data during a well construction operation; applying the well construction model to the real-time well construction data to (i) identify well construction inefficiencies and (ii) generate changes to a well construction parameter; and outputting a command to update the well construction operation using the changes to the well construction parameter.

Example 16 is the non-transitory computer-readable medium of example 15, the operations further comprising: identifying a technical limit of well construction timing using the corpus of historical well construction data, wherein the well construction model is further developed using the technical limit of well construction timing.

Example 17 is the non-transitory computer-readable medium of example 15, the operations further comprising: updating the well construction model using the real-time well construction data and the changes to the well construction parameter.

Example 18 is the non-transitory computer-readable medium of example 15, wherein the well construction parameter comprises drilling parameters of the well construction operation.

Example 19 is the non-transitory computer-readable medium of example 15, wherein applying the well construction model to the real-time well construction data further identifies causes of the well construction inefficiencies of the well construction operation.

Example 20 is the non-transitory computer-readable medium of example 15, wherein developing the well construction model comprises training a machine-learning model using the corpus of historical well construction data.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A method comprising:
    acquiring, by a computing system, a corpus of historical well construction data associated with a set of historical wells;
    developing, by a retro-analysis module of the computing system and using the corpus of historical well construction data, a well construction model that includes an estimated technical limit timeline for a well construction operation;
    acquiring, by a rig activity detection module of the computing system, real-time well construction data during the well construction operation;
    applying, by the computing system and by using the rig activity detection module to analyze the real-time well construction data with respect to the estimated technical limit timeline, the well construction model to the real-time well construction data, applying the well construction model to the real-time well construction data comprising providing the well construction model and the real-time well construction data as input into a process mining algorithm to (i) identify well construction inefficiencies and (ii) generate first recommendations for changes to a well construction parameter;
    generating, by an analysis module of the computing system, second recommendations for changes to the well construction parameter by (i) identifying a deviation between the estimated technical limit timeline and the real-time well construction data and (ii) identifying one or more remedial actions to take in response to the deviation; and
    outputting a command to update the well construction operation using at least one of the first recommendations for changes to the well construction parameter or the second recommendations for the changes to the well construction parameter.

2. The method of claim 1, further comprising:
    updating the well construction model using the real-time well construction data and the first recommendations for changes to the well construction parameter or the second recommendations for changes to the well construction parameter.

3. The method of claim 1, wherein applying the well construction model to the real-time well construction data further identifies causes of the well construction inefficiencies of the well construction operation.

4. The method of claim 1, wherein developing the well construction model comprises training a machine-learning model using the corpus of historical well construction data.

5. The method of claim 1, further comprising:
    updating the corpus of historical well construction data to remove a set of well construction data that is not compatible with a well system constructed by the well construction operation.

6. The method of claim 1, wherein the well construction model is a Petri net.

7. The method of claim 1, wherein developing the well construction model comprises using a trained machine-learning model of the retro-analysis module to determine the estimated technical limit timeline, and wherein the trained machine-learning model is trained on the historical well construction data.

8. A system comprising:
    a processor; and
    a non-transitory memory device communicatively coupled to the processor comprising instructions that are executable by the processor to cause the processor to perform operations comprising:
        acquiring a corpus of historical well construction data associated with a set of historical wells;
        developing, by a retro-analysis module of the system and using the corpus of historical well construction data, a well construction model that includes an estimated technical limit timeline for a well construction operation;

acquiring, by a rig activity detection module of the system, real-time well construction data during the well construction operation;

applying, by using the rig activity detection module to analyze the real-time well construction data with respect to the estimated technical limit timeline, the well construction model to the real-time well construction data, applying the well construction model to the real-time well construction data comprising providing the well construction model and the real-time well construction data as input into a process mining algorithm to (i) identify well construction inefficiencies and (ii) generate first recommendations for changes to a well construction parameter;

generating, by an analysis module of the system, second recommendations for changes to the well construction parameter by (i) identifying a deviation between the estimated technical limit timeline and the real-time well construction data and (ii) identifying one or more remedial actions to take in response to the deviation; and outputting a command to update the well construction operation using at least one of the first recommendations for changes to the well construction parameter or the second recommendations for the changes to the well construction parameter.

9. The system of claim 8, wherein the operations further comprise:

updating the well construction model using the real-time well construction data and the first recommendations for changes to the well construction parameter or the second recommendations for changes to the well construction parameter.

10. The system of claim 8, wherein the well construction parameter comprises drilling parameters of the well construction operation.

11. The system of claim 8, wherein applying the well construction model to the real-time well construction data further identifies causes of the well construction inefficiencies of the well construction operation.

12. The system of claim 8, wherein developing the well construction model comprises training a machine-learning model using the corpus of historical well construction data.

13. The system of claim 8, further comprising:

updating the corpus of historical well construction data to remove a set of well construction data that is not compatible with a well system constructed by the well construction operation.

14. A non-transitory computer-readable medium that includes instructions that are executable by a processing device to perform operations comprising:

acquiring a corpus of historical well construction data associated with a set of historical wells;

developing, by a retro-analysis module and using the corpus of historical well construction data, a well construction model that includes an estimated technical limit timeline for a well construction operation;

acquiring, by a rig activity detection module, real-time well construction data during the well construction operation;

applying, by using the rig activity detection module to analyze the real-time well construction data with respect to the estimated technical limit timeline, the well construction model to the real-time well construction data, applying the well construction model to the real-time well construction data comprising providing the well construction model and the real-time well construction data as input into a process mining algorithm to (i) identify well construction inefficiencies and (ii) generate first recommendations for changes to a well construction parameter;

generating, by an analysis module, second recommendations for changes to the well construction parameter by (i) identifying a deviation between the estimated technical limit timeline and the real-time well construction data and (ii) identifying one or more remedial actions to take in response to the deviation; and outputting a command to update the well construction operation using at least one of the first recommendations for changes to the well construction parameter or the second recommendations for the changes to the well construction parameter.

15. The non-transitory computer-readable medium of claim 14, the operations further comprising:

updating the well construction model using the real-time well construction data and the first recommendations for changes to the well construction parameter or the second recommendations for changes to the well construction parameter.

16. The non-transitory computer-readable medium of claim 14, wherein the well construction parameter comprises drilling parameters of the well construction operation.

17. The non-transitory computer-readable medium of claim 14, wherein applying the well construction model to the real-time well construction data further identifies causes of the well construction inefficiencies of the well construction operation.

18. The non-transitory computer-readable medium of claim 14, wherein developing the well construction model comprises training a machine-learning model using the corpus of historical well construction data.

* * * * *